P. C. HEWITT.
METHOD OF AND MEANS FOR VARYING THE FREQUENCY OF AN OSCILLATING CURRENT.
APPLICATION FILED MAY 12, 1914.
1,321,436.  
Patented Nov. 11, 1919.
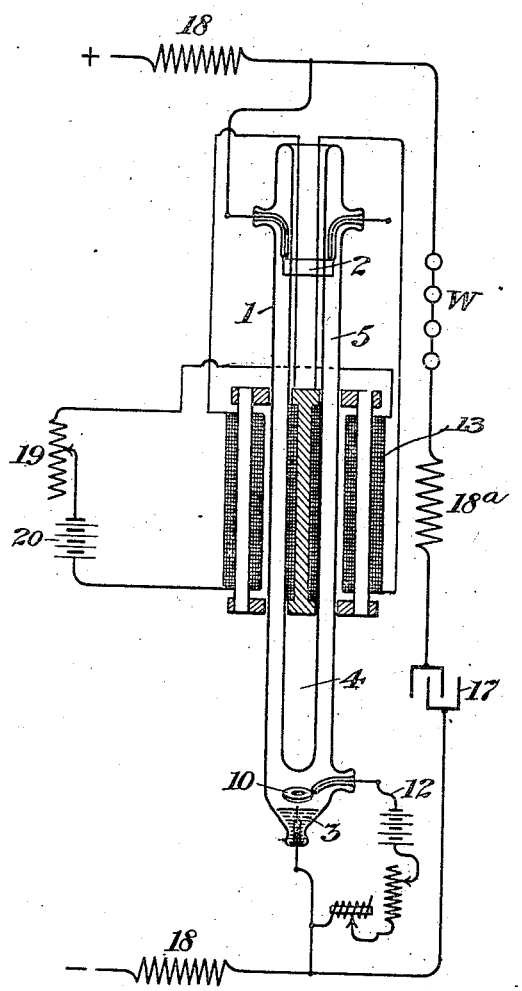
WITNESSES  
INVENTOR  
Peter Cooper Hewitt  
BY Gifford Bull  
his ATTORNEYS

UNITED STATES PATENT OFFICE.

PETER COOPER HEWITT, OF RINGWOOD MANOR, NEW JERSEY.

METHOD OF AND MEANS FOR VARYING THE FREQUENCY OF AN OSCILLATING CURRENT.

1,321,436.

Specification of Letters Patent.   Patented Nov. 11, 1919.

Application filed May 12, 1914.  Serial No. 838,036.

*To all whom it may concern:*

Be it known that I, PETER COOPER HEWITT, a citizen of the United States, residing at Ringwood Manor, in the county of Passaic and State of New Jersey, have invented certain new and useful Improvements in Methods of and Means for Varying the Frequency of an Oscillating Current, of which the following is a specification.
My present invention relates to method of and means for varying the frequency of a periodic or alternating current produced in a circuit including a gas or vapor tube in connection with a condenser.
I have discovered that the frequency of the currents produced by such apparatus may be varied by impressing a variable electric or magnetic field on the space between the electrodes of the gas or vapor tube. As the intensity of the field increases, the frequency of the periodic or alternating currents decreases and as the intensity of the field decreases the frequency of periodic or alternating currents increases. Such changes in frequency may be usefully employed in various arts, among them the arts of wireless telegraphy or telephony and motor control.

In patents already issued to me—for instance, No. 682,695, No. 682,696 and No. 682,697, all dated September 17, 1901, and in pending applications Serial Nos. 838,032, 838,033, 838,034, 838,035, 838,037, filed May 12th, 1914, I have fully described the construction and operation of mercury vapor tubes of the general type illustrated in the drawings of this application, and therefore need not repeat the description of the general principles in this application. While I have shown herein only a mercury vapor tube, it will be understood that any other analogous gas or vapor or evacuated tube may be employed.

In the accompanying drawings 1 is a mercury tube in which 2 is the main positive electrode and 3 the negative electrode. 10 is an auxiliary or "keep alive" positive electrode, and 12 the independent circuit supplying current to the same. The tube has a reëntrant portion 4 forming an annular space 5 for the current. 13 is an electromagnet the field of which is impressed on the space between the main electrodes. The means for producing the magnetic field may consist of a plurality of windings surrounding the tube and also an additional winding located within the reëntrant portion of the tube. 17 is a condenser and 18ª is an inductance. W indicates the work circuit, in this case containing incandescent lamps. 18, 18, are inductances on the line.

The magnet 13 is energized by any suitable source of current, indicated at 20, and this circuit includes means for varying the current, which is indicated diagrammatically at 19. As the current is varied, the field of the magnet 13 is varied, and, as already explained, the frequency of the periodic or alternating currents, or the rate of oscillation, is varied.

The term "gas or vapor tube" as used in these specifications and in the claims is intended to include all forms of devices which are the equivalent of a mercury tube for the purposes of this invention, irrespective of the contents of the tube or container, and irrespective of the means employed to keep the negative electrode alive, or to keep the resistance to starting at the negative electrode at a low value. The term, therefore, as used may include, for example, a tube exhausted to any degree, or a suitable current flow in air or other gas, and may include a device in which the negative electrode is kept constantly alive, or in which the resistance to starting at the negative electrode is maintained at a low value, by being highly heated and may include any path between electrodes controlled mechanically or electrically, where the resistance to starting at the negative electrode is maintained at a low value.

What I claim and desire to secure by Letters Patent of the United States is:

1. The method of controlling the frequency of periodic currents traversing a confined vacuum, gas, or vapor path, which consists in subjecting the path to magnetic lines of force and increasing the lines of force for decreasing the frequency and decreasing the lines of force for increasing the frequency, and in regulating the increase and decrease of the field.

2. The method of controlling the frequency of periodic currents traversing a confined vacuum, gas, or vapor path, which consists in subjecting the path to magnetic lines of force and increasing the lines of force for decreasing the frequency, and in regulating the increase and decrease of the field.

3. The method of controlling the frequency of periodic currents traversing a confined vacuum, gas, or vapor path, which consists in subjecting the path to magnetic lines of force and decreasing the lines of force for increasing the frequency, and in regulating the increase and decrease of the field.

4. The combination with a condenser, of a gas or vapor tube having an annular conducting space extending between the electrodes of said tube and parallel to the direction of current flow between said electrodes, means for impressing a magnetic field on the said annular space to vary the frequency of the condenser discharge through said tube, and means for varying the intensity of said field.

5. The combination with a condenser, of a gas or vapor tube having an annular conducting space parallel to the direction of current flow between the electrodes of said tube, the resistance of one of said electrodes being maintained below its natural value, means for impressing a magnetic field on the said annular space to vary the frequency of the condenser discharge through said tube, and means for varying the intensity of said field.

6. The combination with a vacuum, gas, or vapor device, of means including a condenser for causing periodic or inherently varying currents to flow therethrough, means for establishing a field of force, the lines of which traverse said path, and means for regulating the intensity of such field at will for modifying the frequency of the current variations.

In testimony whereof I have hereunto signed my name in the presence of two subscribing witnesses.

PETER COOPER HEWITT.

Witnesses:
L. A. COLEMAN,
R. A. HEWITT.

Copies of this patent may be obtained for five cents each, by addressing the "Commissioner of Patents, Washington, D. C."